(12) United States Patent
Edwards et al.

(10) Patent No.: US 6,947,490 B1
(45) Date of Patent: Sep. 20, 2005

(54) CELLULAR RADIO COMMUNICATIONS SYSTEM

(75) Inventors: Fraser Edwards, Bishops Stortford (GB); Christopher J. Adams, Chesterfield (GB); Graham Dolman, Saffron Walden (GB); Paul M Row, Bishops Stortford (GB); Mark Watkins, Great Dunmow (GB)

(73) Assignee: Nortel Networks Limited, St. Laurent (CA)

( * ) Notice: Subject to any disclaimer, the term of this patent is extended or adjusted under 35 U.S.C. 154(b) by 799 days.

(21) Appl. No.: 09/599,275

(22) Filed: Jun. 22, 2000

(51) Int. Cl.[7] .............................................. H04L 23/02
(52) U.S. Cl. ...................................................... 375/261
(58) Field of Search ................................. 375/261, 219, 375/295, 316, 130, 146, 147, 149; 714/786, 790; 455/422

(56) References Cited

U.S. PATENT DOCUMENTS 5,940,439 A    8/1999   Kleider et al. .............. 375/225
6,330,288 B1 * 12/2001   Budka et al. ................ 375/296
6,606,357 B1 *  8/2003   Cobb et al. .................. 375/281
6,735,183 B2 *  5/2004   O'Toole et al. ............. 370/311

OTHER PUBLICATIONS

Papers regarding the Ensemble Adaptive IP System for LMDS.

* cited by examiner

*Primary Examiner*—Khai Tran
(74) *Attorney, Agent, or Firm*—Barnes & Thornburg

(57) ABSTRACT

A cellular radio communication system for transmitting blocks of data over transmission links in which the quality of the transmission links are monitored. The system comprises a data storage means for storing sets of modulation scheme and forward error correction coding level pairs to give an optimum data rate at a predetermined bit error rate and a predetermined symbol rate for different quality transmission links. The database is interrogated and a modulation scheme and forward error correction coding level pair is allocated and applied to the blocks of data transmitted over a transmission link dependent on the monitored quality of the transmission link.

58 Claims, 14 Drawing Sheets

CELLULAR RADIO COMMUNICATIONS SYSTEM

FIELD OF INVENTION

The present invention relates to a cellular radio communication system. In particular the present invention relates to a broadband wireless access system suitable for the delivery of multi-media services.

BACKGROUND OF INVENTION

There is a growing demand for broadband wireless access systems which can deliver the high data rates required for the provision of multi-media services. Such wireless access systems operate within licensed frequency bands. Accordingly, these systems are continually developing to carry more data across the limited frequency band allocated to them. Pressure for this development is two fold. Firstly, there is increased demand for multi-media services from subscribers to the system. Secondly, revenue for the network operator will increase as billing is calculated on a per byte of information delivered basis as opposed to on a timed basis.

The performance of wireless access communication systems is prone to dynamic degradation, ie. time variant degradation, due to changing environmental conditions. Wireless transmissions in the frequency range from 10 to 50 GHz are particularly prone to dynamic degradation resulting from rain and from the growth and movement of foliage located in the path of the transmission. FIG. 1 shows the attenuation of a 30 GHz signal in dB per kilometer due to rainfall against the percentage of time that such rainfall occurs within climate zone 'F' which zone covers the UK.

This type of dynamic degradation has been taken account of in existing wireless access systems by designing the systems for operation in worst case environmental conditions. This has been achieved by the use of robust modulation schemes such as QPSK (Quadrature Phase Shift Keying), also known as 4-QAM (Quadrature Amplitude Modulation) which deliver low BERs (bit error rates) of the order of $10^{-9}$, ie. one incorrect bit per $10^9$ bits transmitted, in poor environmental conditions. However, designing such systems for worst case environmental conditions in this way results in low rates of data transmission.

As can be seen from FIG. 1, for the majority of time transmission conditions are good. Adaptive modulation techniques have been proposed which enable higher data rates to be achieved by the use of 16-QAM or 64-QAM modulation schemes when the transmission conditions across a wireless link are improved or where the distance over which the link extends is relatively low. In this way the rate of data transmission within a limited frequency band can be improved.

In known cellular wireless access system a frequency plan is implemented over a geographical area covered by the system. The frequency plan allocates channels within the frequency band to localised cells and due to attenuation of a radio signal across the cells, the same channel can be reused within other cells in the frequency plan. The aim is to maximise frequency re-use without causing interference between parts of the frequency plan which use the same channels. Generally, a base station is associated with a cell to transmit radio frequency signals to all end users or CPEs (Customer Premise Equipments) located within the geographical area covered by the cell. The uplink from the CPEs in the cell to the base station may be a common medium access uplink, for example FTDMA (Frequency or Time Division Multiple Access) uplink in which time and carrier slots can in some way be allocated for use by the CPEs to send signals to the base station. The downlink from the base station to the CPEs may be a TDA (Time Division Access) downlink, with time slots over which the base station sends signals to the CPEs.

One known adaptive communication system is disclosed in U.S. Pat. No. 5,940,439 and operates by varying the coding rate, modulation method and the symbol rate responsive to the status of the radio transmission channels or carriers. The system provides improvements in coded operation to take into account changing communication channel conditions. The system determines optimal voice coding rates, coding strategies and modulation for optimum voice quality and intelligibility. Because three variables are altered, ie. modulation scheme, symbol rate and coding rate, there is no unique solution to the choice of these variables for a set channel status. The bandwidth of the channels used in this system will have to be set to accommodate the maximum symbol rate that can be selected. Thus, when the optimum symbol rate is less than this maximum symbol rate bandwidth will be wasted. Accordingly, the system described in U.S. Pat. No. 5,940,439 is not efficient in its use of bandwidth. Also, U.S. Pat. No. 5,940,439 does not provide an algorithm for determining the three variables.

Another approach to optimising the use of bandwidth is automatic repeat request (ARQ). In this approach the receiving unit, be it a base station or a CPE, detects which signals sent across the transmission link have been received with errors in them and sends a feedback message to the transmitting unit requesting that the signals which have not been correctly received are sent again. This is an alternative way of increasing or decreasing the amount of information which is sent across the transmission link dependent on environmental conditions. In poor transmission conditions, more data will have to be se-sent and so data rates will be low. In good transmission conditions, less data will have to be re-sent and so data rates will be higher. However, this method has a degree of transmission delay inherent within it which may not be appropriate for all multimedia services. It is also inefficient in terms of the amount of uplink or downlink resource used for services requiring a low bit error rate.

It is also known to use forward error correction FEC) in which a FEC code is added to the data payload of a packet sent across a transmission link. The FEC code is used by the receiving unit to detect and correct errors in the data payload received by the receiving unit, so that they do not have to be re-sent over a transmission link.

OBJECT OF THE INVENTION

The present invention seeks to provide an improved cellular radio communication system which can deliver optimised data rates with low bit error rates for the prevailing transmission conditions, thus making efficient use of the available bandwidth.

STATEMENT OF INVENTION

According to a first aspect of the present invention there is provided a cellular radio communication system for transmitting data over transmission links, wherein different modulation scheme and forward error correction coding level pairs are dynamically allocated to the transmission links so as to give an optimum data rate at a predetermined bit error rate and a predetermined symbol rate. According to the present invention a modulation scheme and forward error correction code level is allocated in order to optimise the data rate of the transmission links to make efficient use of bandwidth for a predetermined standard of bit error rate.

The different modulation scheme and forward error correction coding level pairs are preferably dynamically allocated depending on the quality of the transmission links. Thus, when the quality of a transmission link is good a high symbol modulation scheme, such as 64-QAM can be allocated in order to achieve a high data rate at the required bit error rate. When the quality of the transmission link is reduced a lower symbol modulation scheme such as QPSK can be used to achieve the bit error rate at the cost of a reduced data rate across the transmission link. Although the use of forward error correction coding inherently reduces data rates, the dynamic allocation of the forward error correction coding levels enables higher symbol modulation schemes to be used for poorer transmission links while still maintaining the required standard of bit error rate to enable an overall increase in data rates achievable over a range of quality of transmission links. Preferably, the quality of transmission links are periodically monitored.

The transmission links may be links between a plurality of end user terminals located within a cell and a base station located within the cell.

The system may allocates a default modulation scheme and/or forward error correction coding level for each transmission link for use when a call is initiated over the transmission link. The default modulation scheme will generally be the highest symbol modulation scheme or optimum modulation scheme/coding level pair that can be used for that transmission link in poor environmental conditions while still maintaining the required bit error rate.

Preferably the system comprises means for adjusting the power of the transmission links dependent on the level of traffic over the transmission links while maintaining the predetermined bit error rate. This may be achieved by increasing the level of forward error correction coding allocated to the transmission links so as to use all the bandwidth of the transmission links and by reducing the power of the transmission links dependent on the change in the level of forward error correction coding to maintain the predetermined bit error rate. Thus, if a particular cell comprising the base station and the end user terminals does not need to utilise the total bandwidth of its transmission links, the level of coding can be increased to use up the remaining bandwidth which enables the power of the transmission links to be reduced while still achieving the required bit error rate. The whole bandwidth allocated to the cell is used but at a lower power level. The fact that the cell is transmitting at a lower power level means that it is generating less interference in neighbouring cells. This enables the neighbouring cells to support a higher data rate if they need to. Thus, those cells that do not require maximum data throughput can effectively release bandwidth to neighbouring cells by using the minimum level of power associated with achieving the required bit error rate.

In a preferred embodiment of the present invention a block of data may comprises a header and a payload and a default modulation scheme may be allocated to the headers of the blocks of data. Thus the header can be recovered by a receiving unit operating at the default modulation scheme and data concerning the modulation scheme used for the payload can be recovered and used in the demodulation of the payload.

According to a second aspect of the present invention there is provided a cellular radio communication system for transmitting blocks of data over transmission links, comprising:
    a data storage means for storing sets of modulation scheme and forward error correction coding level pairs which give an optimum data rate at a predetermined bit error rate and a predetermined symbol rate for different quality transmission links;
    means for monitoring the quality of a transmission link;
    means for interrogating the database and allocating a modulation scheme and forward error correction coding level pair to the blocks of data transmitted over a transmission link dependent on the monitored quality of the transmission link; and
    means for applying the allocated modulation scheme and forward error correction coding level to the blocks of data.

According to a third aspect of the present invention there is provided a base station for transmitting blocks of data over a plurality of transmission links to a plurality of end user terminals, comprising:
    a data storage means for storing sets of modulation scheme and forward error correction level coding pairs which generate an optimum data rate at a predetermined bit error rate and a predetermined symbol rate for different quality transmission links;
    means for interrogating the database and allocating a modulation scheme and forward error correction coding pair to the blocks of data to be transmitted over each transmission link dependent on the quality of the transmission link; and
    means for applying the allocated modulation scheme and forward error correction coding level to the blocks of data.

According to a fourth aspect of the present invention there is provided an end user terminal for receiving and transmitting blocks of data over a transmission link to a base station, comprising:
    means for applying a modulation scheme and forward error correction coding level to the blocks of data in accordance with instructions from the base station wherein the modulation scheme and forward error correction level generate an optimum data rate over the transmission link for a predetermined symbol rate and a predetermined bit error rate.

The second, third and fourth aspects of the present invention have the same advantages discussed above in relation to the first aspect of the present invention.

The modulation schemes used in the present invention can be selected from 64-QAM, 1-QAM and QPSK and the forward error correction coding used may be a BCH forward error correction code.

According to a preferred embodiment of the present invention means are provided for storing a default modulation scheme suitable for the or each transmission link in poor environmental conditions for use when a call is initiated over the transmission link. Thus, a call may be initiated successfully at any time despite the prevailing environmental conditions.

According to a preferred embodiment of the present invention the transmission links may be links between a plurality of end user terminals located within a cell and a base station located within the cell. In this case the default modulation scheme for each end user terminal may be dependent on the distance between the end user terminal and the base station.

Preferably the present invention utilises a power control scheme for improving the use of bandwidth across a geographical area covered by a mosaic of cells by using means for adjusting the power of the transmission links dependent on the level of traffic over the transmission links while maintaining the predetermined bit error rate. Preferably, means are provided for increasing the level of forward error correction coding allocated to the transmission links so as to use the bandwidth of the transmission links and means are provided for reducing the power of the transmission links dependent on the increase in the level of forward error correction coding to maintain the predetermined bit error rate.

The present invention is particularly suited for use in broadband wireless access systems. The transmission links from the end user terminals to the base station may comprise a common medium access uplink and the transmission links from the base station to the end user terminals may comprise a broadcast downlink.

According to the present invention a block of data may comprises a header and a payload and means are provided for storing a default modulation scheme suitable for the or each transmission link in poor environmental conditions and the means for allocating a modulation scheme to the blocks of data transmitted over the transmission link allocates the default modulation scheme to the headers of the blocks of data.

According to a fifth aspect of the present invention there is provided a receiving unit is provided for receiving signals from at least one transmission link, which signals carry blocks of data where each block comprises a payload and a header containing information about the modulation scheme applied to the payload wherein the receiving unit comprises:

a receiving antenna means;

a downconverter means for downconverting a radio frequency signal received by the antenna means to an intermediate frequency signal;

an IQ demodulator means for demodulating the intermediate frequency signal;

a recovery means for receiving the output of the IQ demodulator and for recovering the payload modulation scheme from each header;

an IQ signal detection block for receiving the output of the IQ demodulator, the IQ signal detection block comprising:
  a first arm for detecting an IQ demodulated signal from a first modulation scheme;
  a second arm for detecting an IQ demodulated signal from a second modulation scheme; and
  switching means for switching the output from the IQ demodulator through one or the other of the arms dependent on the payload modulation scheme recovered by the recovery means.

According to a sixth aspect of the present invention there is provided a transmitting unit for transmitting signals over at least one transmission link, which signals carry blocks of data wherein the transmitting unit comprises:

a database for storing modulation schemes which generate an optimum data rate at a predetermined bit error rate and symbol rate for different quality transmission links;

a processor for interrogating the database and allocating a modulation scheme to the blocks of data to be transmitted dependent on the quality of the transmission link;

an IQ signal generation means comprising:
  a first arm for generating an IQ signal for a first modulation scheme;
  a second arm for detecting an IQ signal for a second modulation scheme; and
  switching means for switching data through one or the other of the arms dependent on the modulation scheme allocated to the data.

According to a seventh aspect of the present invention there is provided a radio frequency signal IQ modulated with blocks of data wherein a block of data comprises a header and a payload and the payload is modulated according to a higher symbol IQ modulation scheme than the header. Preferably, the header is modulated according to a QPSK modulation scheme and the payload is modulated according to a 16-QAM or a 64-QAM modulation scheme.

According to an eighth embodiment of the present invention there is provided method of operating a cellular radio communication system for transmitting blocks of data over transmission links, comprising the steps of:

storing sets of modulation scheme and forward error correction coding level pairs which give an optimum data rate at a predetermined bit error rate and a predetermined symbol rate for different quality transmission links;

monitoring the quality of a transmission link;

interrogating the database and allocating a modulation scheme and forward error correction coding level pair to the blocks of data transmitted over the link dependent on the monitored quality of the transmission link; and applying the allocated modulation scheme and forward error correction coding level to the blocks of data.

The method has the same advantages as associated with the communication system according to the first aspect of the present invention.

BRIEF DESCRIPTION OF DRAWINGS

One embodiment of the present invention will now be described in relation to the accompanying Figures in which.

DETAILED DESCRIPTION OF INVENTION

Figure 1:
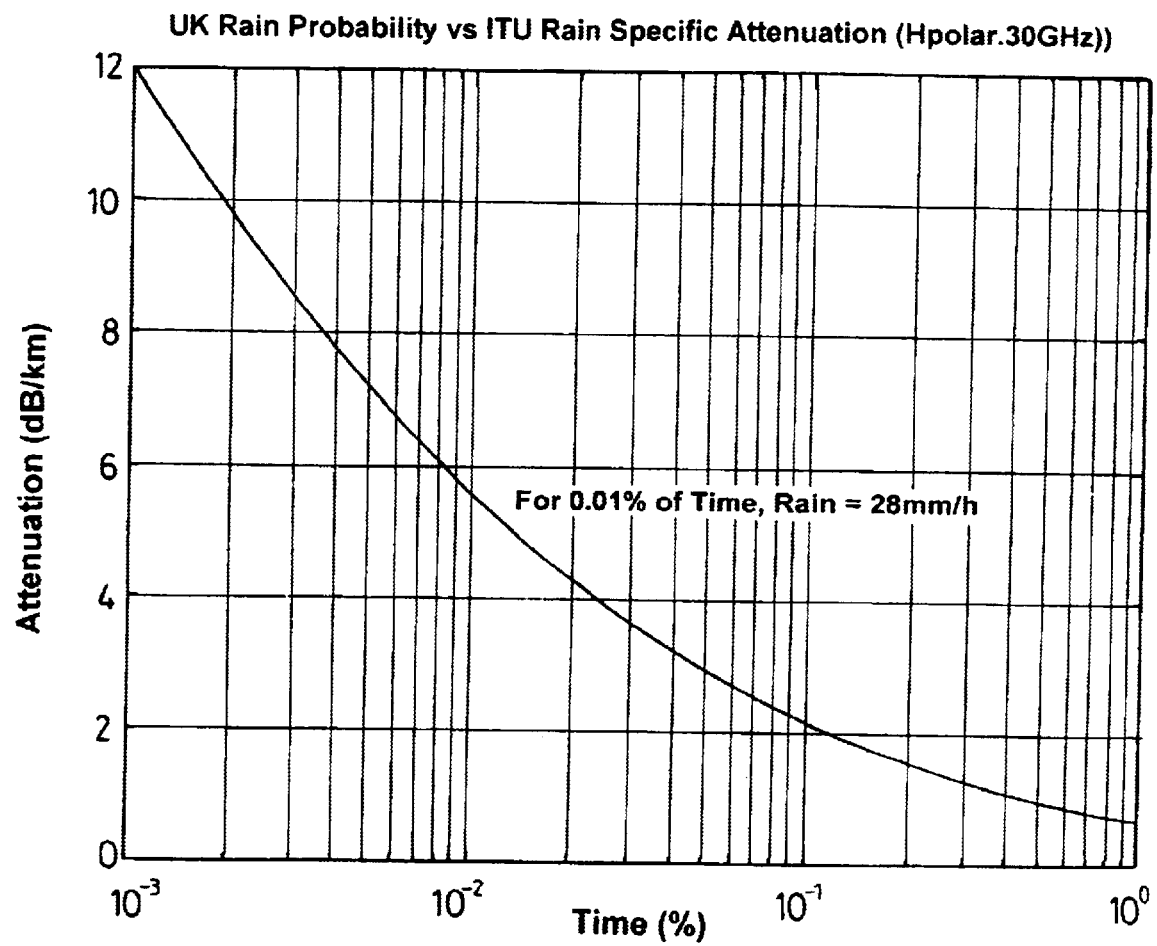
FIG. 1 is a graph which shows the level of attenuation to a 30 GHz signal due to rain levels against the probability of such rain levels occurring in UK climate zone 'F'.
Figure 2:
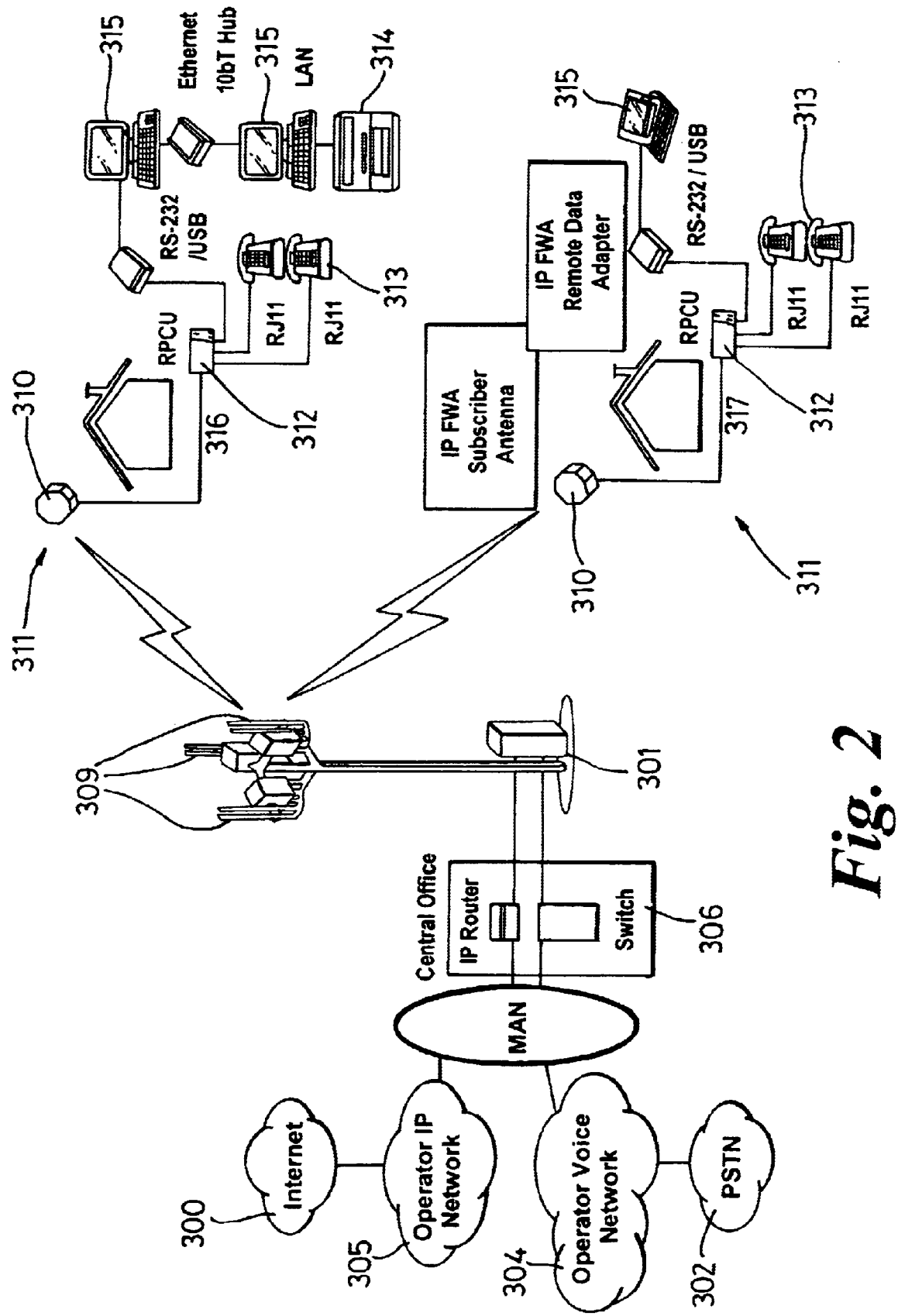
FIG. 2 is a schematic representation of a fixed wireless access architecture suitable for use with a cellular radio communication system according to the present invention.

FIG. 2 shows a fixed wireless access architecture suitable for use in a cellular radio communication system according to the present invention. The architecture comprises a fixed wireless access base station (301) which can transmit radio frequency signals to a plurality of CPEs (Customer Premise Equipments) (311) within a localised area or cell. The base station has an array of antennas (309) for transmitting signals to and receiving signals from antennas (310) which form part of the CPEs (311). The antennas (310) located at a subscriber's premises and the base station antennas (309) are generally located in a raised position at some distance from the ground in order to reduce the effect of obstacles in the transmission paths between the base station and the CPEs. In this way a line of sight (LOS) or near line of sight (NLOS) transmission link can be achieved between the base station and each CPE within the cell. The CPE antennas (310) are each connected to associated remote power control units (RPCUs) (312) which are themselves connected to associated telephone (313), facsimile (314) and computing (315) equipment.

In the example shown in FIG. 2, the base station (301) is connected to the Public Switched Telephone Network (PSTN) (302) which provides telephone services via operator voice network (304). The base station (301) is also connected to the Internet (300) via operator IP (Internet Protocol) network (305). The operator networks (304) and (305) are connected to the base station (301) via a central office (306) which provides separate data links for voice and data. The central office (306) is connected to the operator IP network (305) and the Operator Voice Network via a Metropolitan Area Network (MAN) used to interconnect LANs (Local Area Networks) around a town or city.

Figure 3:
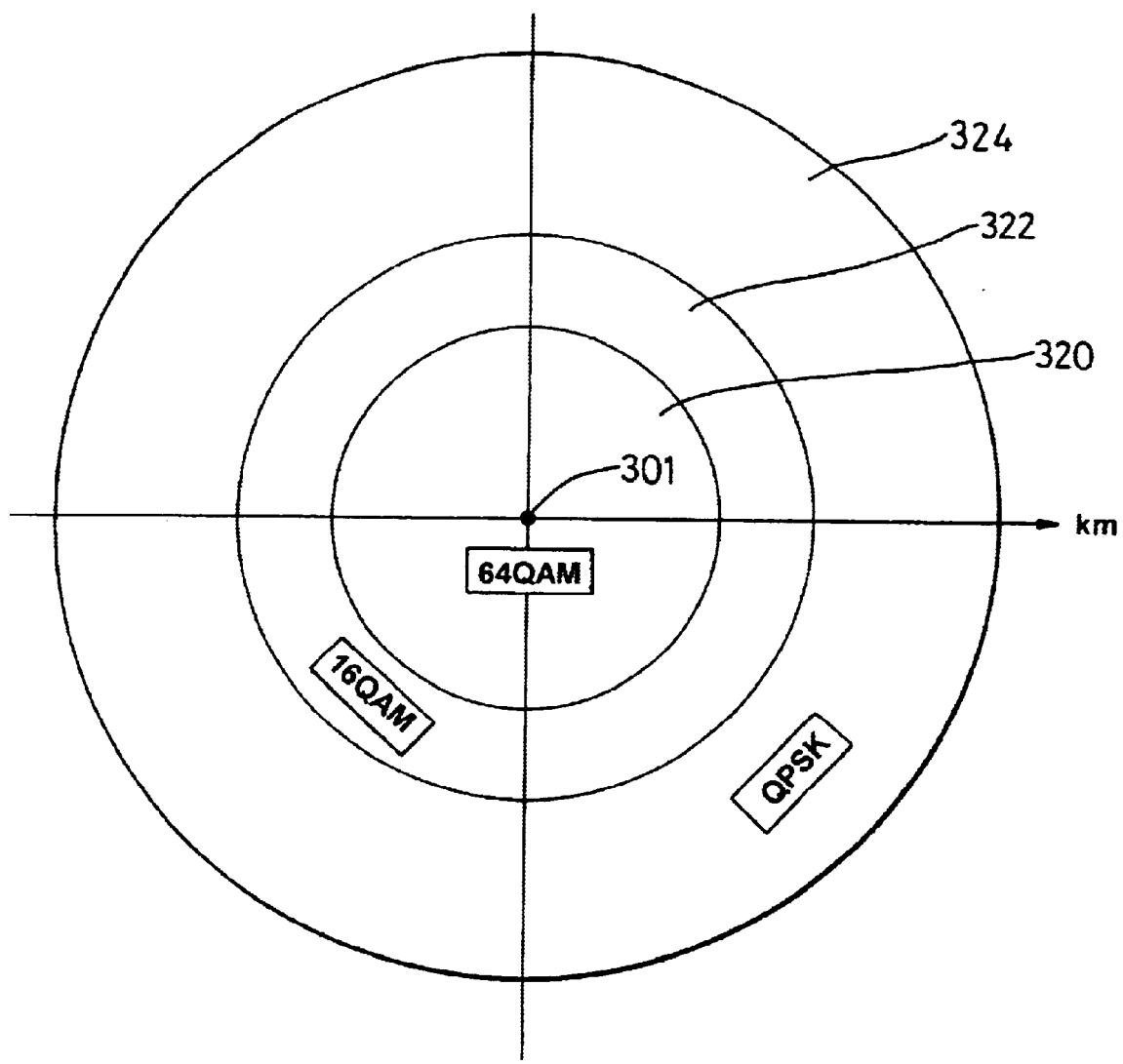
FIG. 3 is a schematic representation of a cell of a cellular radio communication system according to the present invention in which different modulation techniques are allocated to different regions of the cell dependent on distance from the base station.
Figure 8A:
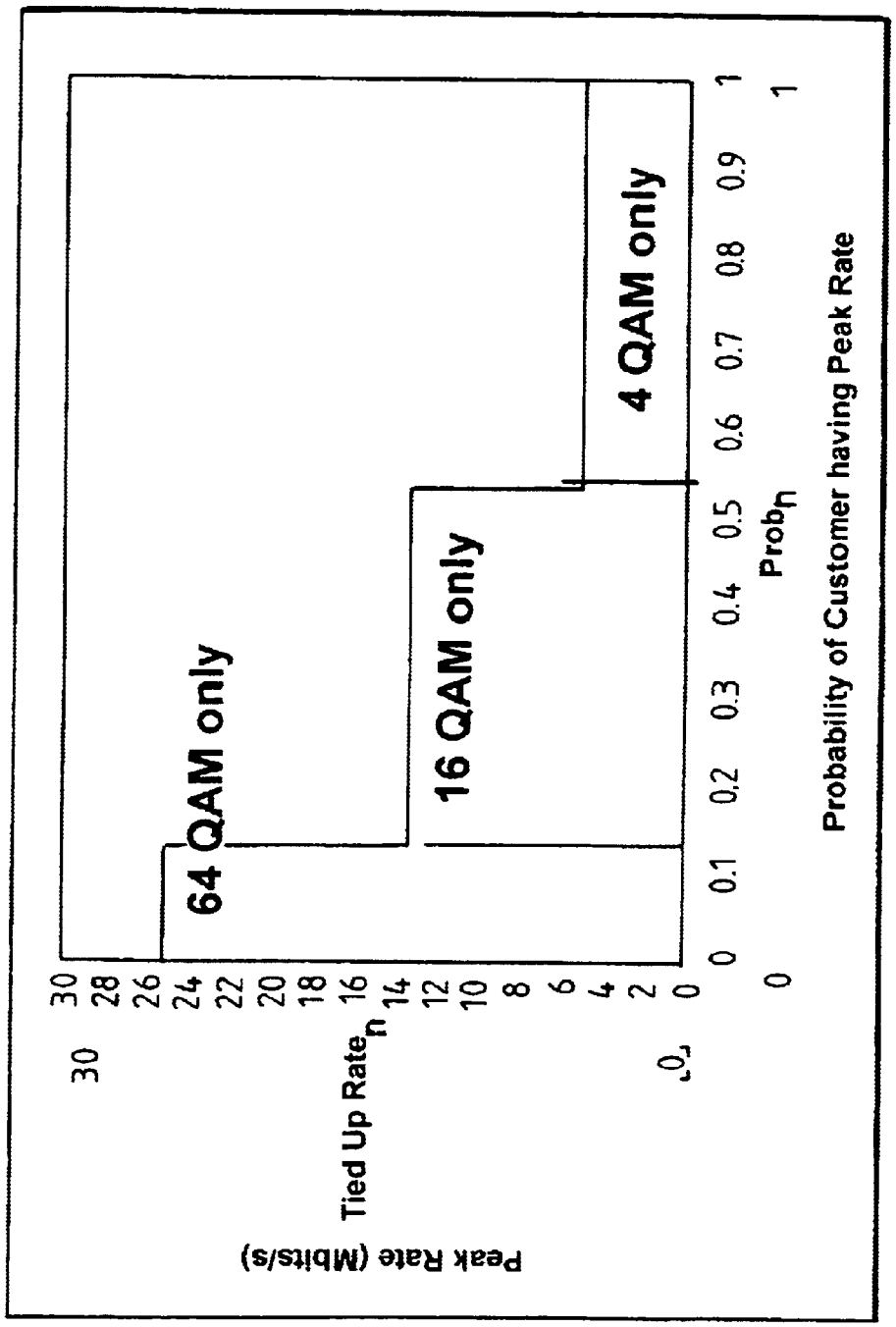
FIGS. 8a and 8b show graphs of the peak data rate against the percentage change of a CPE having such a rate for a known system and a system according to the present invention respectively.

The cell shown in FIG. 3 has a base station (301) located at its centre and is split into three regions. The CPEs located within the central region (320) are relatively close to the base station and so the transmission links between these CPEs and the base station (301) can use a default 64-QAM modulation scheme while still achieving an acceptable bit error rate (BER) of around $10^{-9}$ regardless of the prevailing environmental conditions. The CPEs located within the inner annulus (322) are further away from the base station (301) and so transmission links between these CPEs and the base station can use a default 16-QAM modulation scheme while still achieving an acceptable bit error rate of around $10^{-9}$ regardless of the prevailing environmental conditions. The CPEs located within the outer annulus (324) are furthest away from the base station and so transmission links between these CPEs and the base station (301) use a default QPSK modulation scheme which can achieve an acceptable bit error rate of around $10^{-9}$ regardless of the prevailing environmental conditions. This system is designed so that it can maintain an acceptable bit error rate in the worst environmental conditions which occur less than 1% of the time. As shown in FIG. 8a, if this scheme is implemented without further adaptation, just over 10% of customers receive a data rate of 25 Mbits/s with a 100% probability, approximately 40% of customers receive a data rate of 13 Mbits/s with a 100% probability and just under 50% of customers receive a data rate of 5 Mbits/s with a 100% probability.

Figure 6:
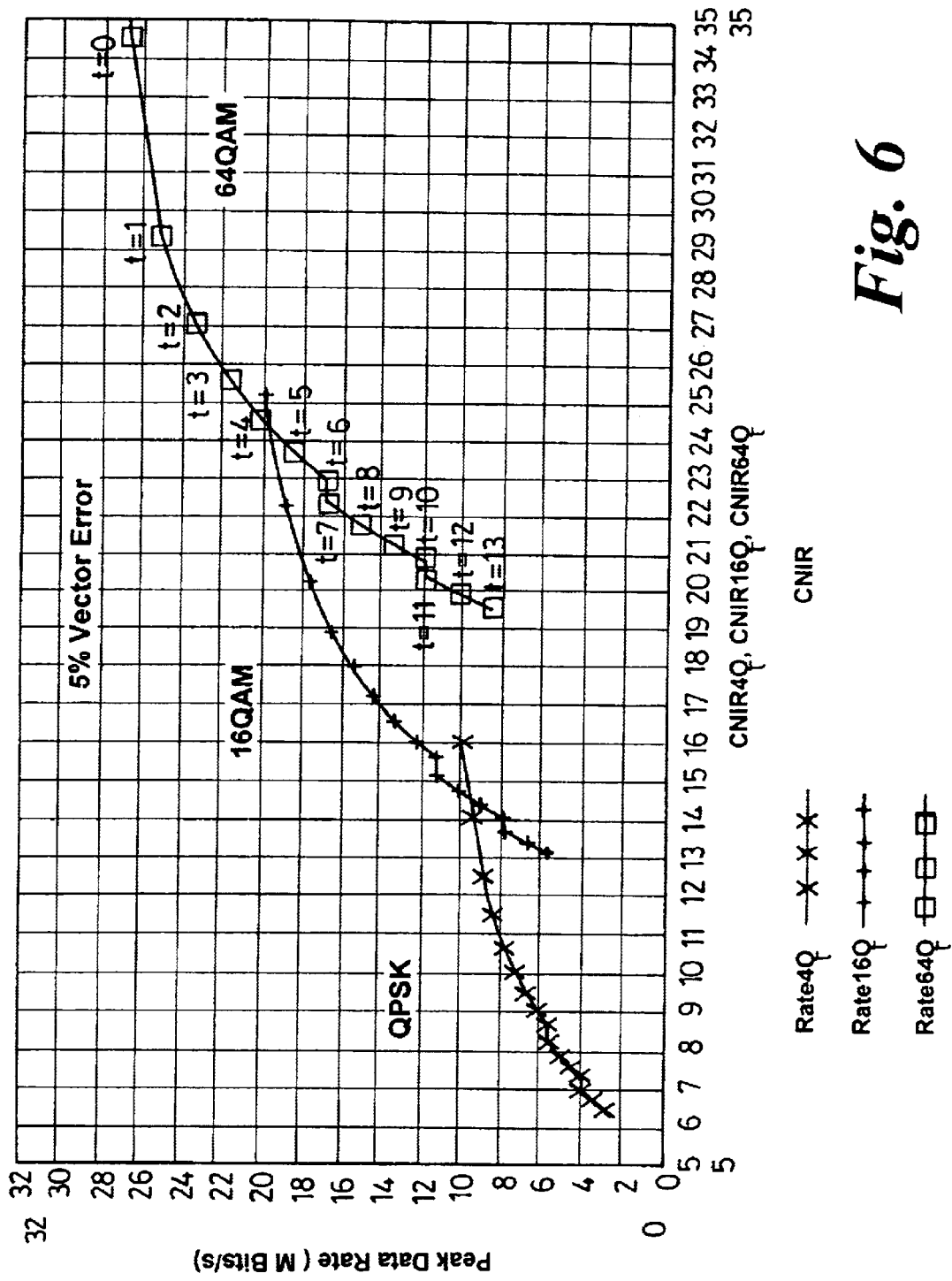
FIG. 6 is a graph showing the peak data rate achievable according to the present invention for varying carrier to noise interference ratios (CNIRs) for QPSK, 16-QAM and 64-QAM modulation schemes assuming a signalling rate (symbol rate) of 5 Mbaud.

According to the present invention a level of FEC (forward error correction) coding and a modulation scheme is selected which provides an optimised data rate for a transmission link between a base station and a CPE in accordance with the graph shown in FIG. 6 for a CNIR (carrier to noise and interference ratio) detected for that transmission link. The graph in FIG. 6 is based on a constant symbol rate of 5 Mbaud and a constant bit error rate of $10^{-9}$. In this illustrative example the type of FEC coding used is BCH (Bose, Chaudhuri and Hocquenghem), however other code types could be used. Starting from the right of FIG. 6, for a high quality transmission link having a CNIR of 35, then a 64-QAM modulation scheme can be used with no FEC coding. Moving towards the left on the 64-QAM curve of FIG. 6, successive boxes marked on the curve indicate a step in the level of FEC coding, from t=0 to 13. For example, for a CNIR of between 29 and 34 a level 1 FEC code (ie. t=1) has to be used and for a CNIR of between 27 and 29 a level 2 FEC code has to be used to maintain a BER of $10^{-9}$. Where the 64-QAM and 16-QAM plots overlap, the modulation scheme/FEC pairing which generates the highest data rate is preferentially selected. For example, for a CNIR of 25, 64-QAM modulation and a level 4 FEC code will provide the highest data rate, whereas for a CNIR of 21, 16-QAM modulation and a level 2 FEC code will provide the highest data rate. Moving towards the left on the 16-QAM curve of FIG. 6, successive boxes marked on the curve indicate a step in the level of FEC coding, from t=0 to 15. Moving further to the left of FIG. 6, for a CNIR of 18 then a 16-QAM modulation scheme and a level 4 FEC code are selected. Again, where the 16-QAM and the QPSK plots overlap, the modulation scheme/FEC pairing which generates the highest data rate is preferentially selected. For example, for a CNIR of 16, 16-QAM modulation and a level 7 FEC code will provide the highest data rate, whereas for a CNIR of 14, QPSK modulation and a level 1 FEC code will provide the highest data rate. Moving towards the left on the QPSK curve of FIG. 6, successive boxes marked on the curve indicate a step in the level of FEC coding, from t=0 to 15. Moving further to the left of FIG. 6, for a CNIR of 11 then a QPSK modulation scheme and a level 4 FEC code are selected.

The modulation scheme and FEC allotted to a transmission downlink between a base station and a CPE is preferably allocated based on a measurement made by the CPE, ie. the CPE measures the quality of the downlink. This measurement is then conveyed to the base station via the uplink. At the start up of a call a default modulation technique is used which will generally be the most robust modulation technique for the CPE concerned. The default modulation could for example be allocated depending on the position of the CPE in the cell in accordance with FIG. 3. As the call progresses and feedback as to the quality of the transmission downlink is received by the base station, the modulation and coding is adjusted in accordance with the graph in FIG. 6 to improve data throughput.

Figure 9:
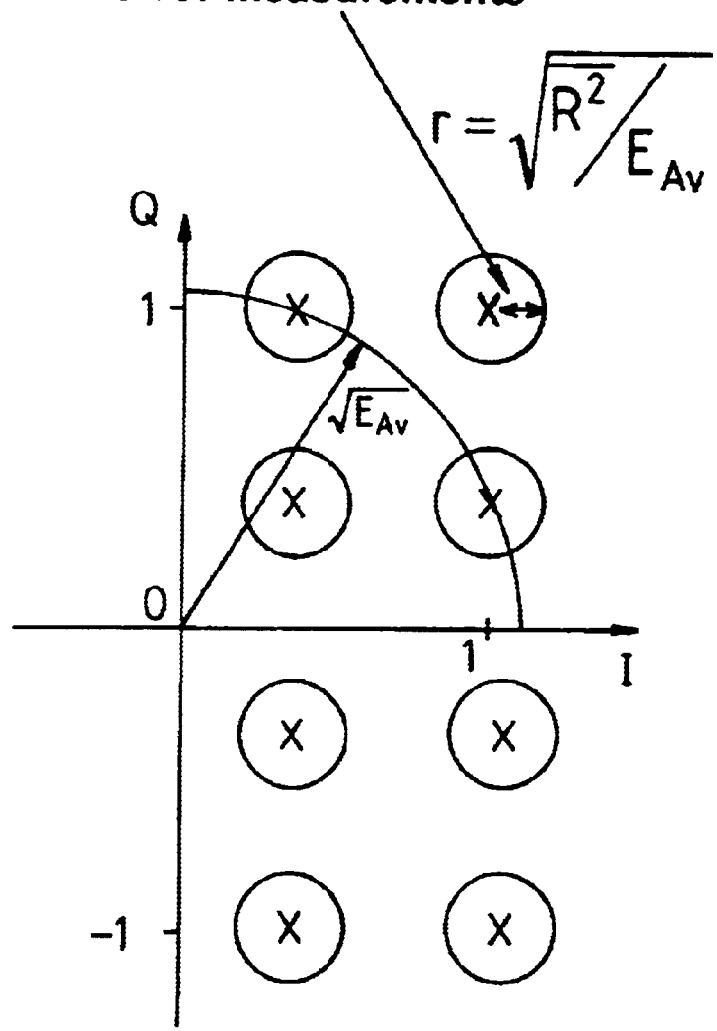
FIG. 9 represents the IQ modulation plot for a 16-QAM modulation scheme showing the basis on which the carrier to noise and interference ratio of a carrier.

The CNIR level will be calculated from a measurement vector error. Vector error can be calculated in the conventional manner by calculating the RMS (root means square) value of the spread of detected symbols (constellation points) around the actual (unperturbed) value of that symbol. For example, referring to FIG. 9, for a 16-QAM modulation scheme for 1 going from 0 to 1 and Q going from −1 to 1, the positions of the symbols or constellation points are shown by an X. When a 16-QAM modulated signal is transmitted over a transmission link and then demodulated, the detected values will be spread about each constellation point due to the effects of noise and interference on the transmission link. The CNIR value is $10 \log(r^2)$ where r is the RMS value.

Figure 4:
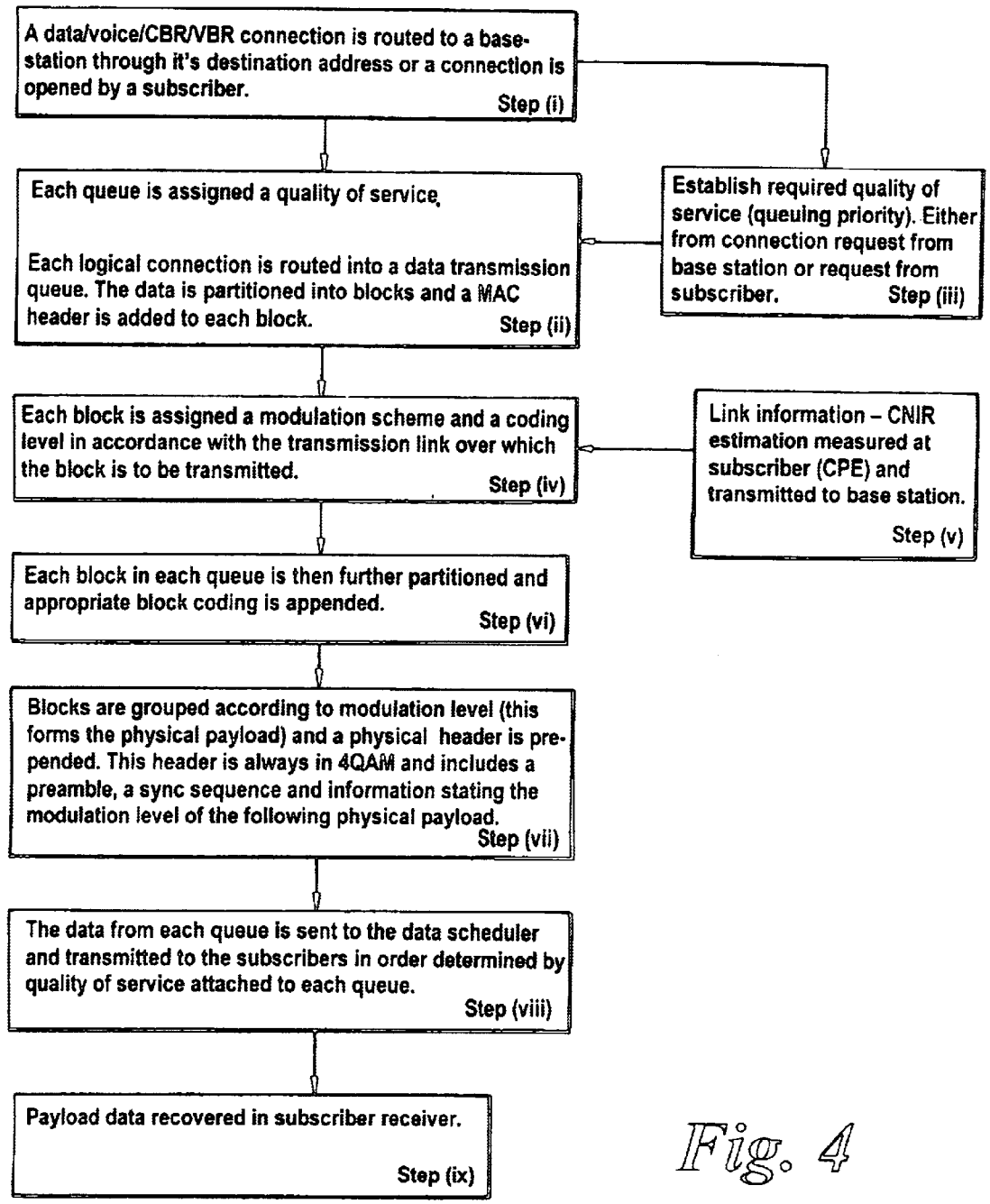
FIG. 4 is a flow chart showing the steps involved in the transmission of packets across the downlink, ie. from base station to CPE in accordance with the present invention.

The flow chart in FIG. 4 which shows the steps in the formation and transmission of signals across the downlink, ie. from base station to the CPEs according to one embodiment of the present invention.

When a call is initiated outside of the cell to a CPE within the cell it is routed via the base station. It may for example be a data, voice, constant bit rate (CBR) or variable bit rate (VBR) call and will have associated with it a required quality of service. The term "call" is used here to cover both traditional switched connection based systems, such as ATM and connectionless systems, such as IP. Each such call is routed via the base station in accordance with a connection set up between a location outside of the cell and the customer or in accordance with packet header information (STEP i).

Figure 7:
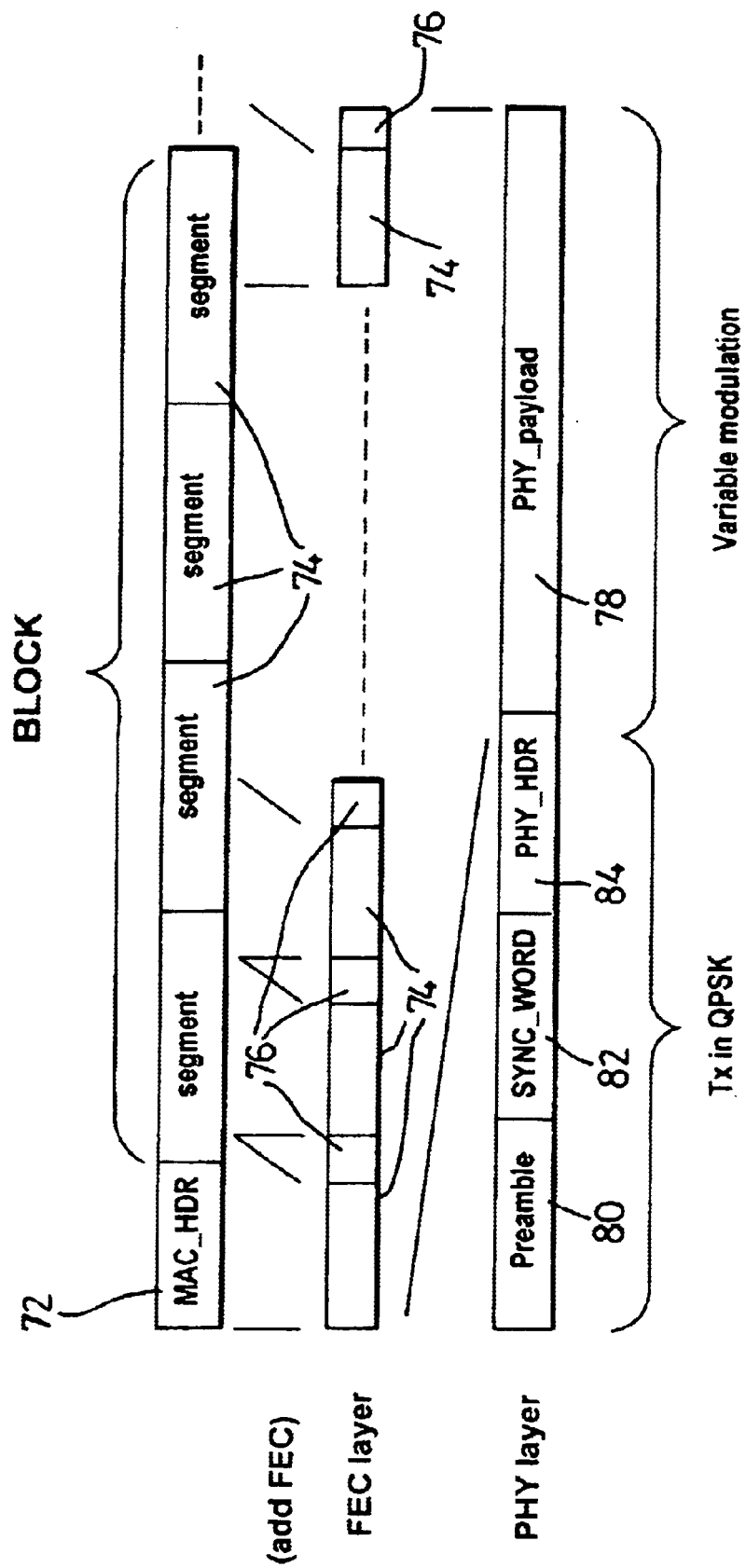
FIG. 7 shows schematically how blocks of data are assembled for transmission across a carrier according to the present invention.

Each call is routed into a data transmission queue in accordance with its requested quality of service (via STEP iii). The data in each queue is partitioned into blocks and a Medium Access Control (MAC) header (72) is added to each block, as shown in the top layer of FIG. 7 (STEP ii). Each block is assigned a modulation scheme and FEC coding level depending on the quality measurement made by the CPE which the block is to be sent to, which measurement is transmitted to the base station (STEP iv and v). As the call progresses the base station will receive ongoing feedback from the CPEs in the cell about the quality of the downlink and will alter the modulation and coding scheme accordingly. Each block is then partitioned into segments (74) and the appropriate FEC coding (76) is added to each segment, as shown in the middle layer of FIG. 7 (STEP vi). The blocks are then re-assembled from the segments with FEC coding added and the blocks are grouped according to their allocated modulation level as shown in the bottom or physical layer of FIG. 7. These groupings of blocks form the physical payload (78) for the physical layer to which is pre-appended a physical layer header, as shown in the bottom layer of FIG. 7 (STEP vii). This header is always allocated a modulation of 4-QAM (QPSK) and includes a preamble (80), a sync sequence (82) and information (84) stating the modulation and coding applied to the following physical payload (78). The thus, configured data from each queue is then sent to the base station data scheduler and transmitted to the subscribers across the transmission link in an order determined by the quality of service associated with each queue (STEP viii). At the CPE the information in the physical header is recovered using QPSK and for example using a correlation code. The physical payload is then recovered by demodulation using the demodulation and coding scheme set out in the physical header (STEP ix).

Figure 5:
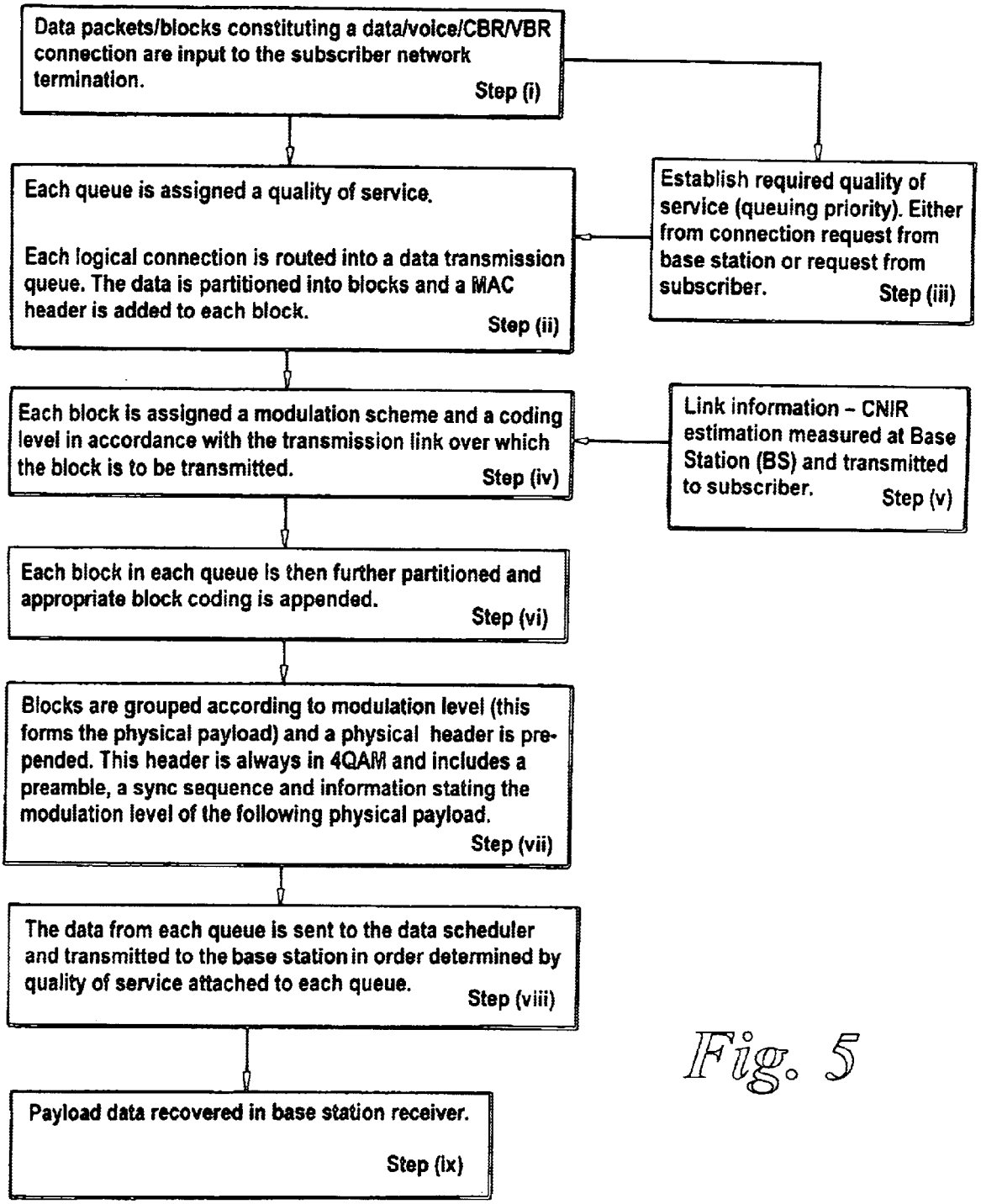
FIG. 5 is a flow chart showing the steps involved in the transmission of packets across the uplink, ie. from the CPE to the base station in accordance with the present invention.

The flow chart in FIG. 5 shows the steps in the formation and transmission of signals across the uplink, ie. from a CPE to the base station.

Where a call is initiated by a CPE a request will be made by the CPE to the base station. The call may for example be a data, voice, constant bit rate (CBR) or variable bit rate (VBR) call and will have associated with it a required quality of service. Again, the term "call" is used here to cover both traditional switched connection based system, such as ATM or connectionless system, such as IP. Each such call is routed via the base station in accordance with a connection set up between the customer and a location outside of the cell or in accordance with packet header information (STEP i). The request will be made by the CPE, for example on a contention basis, using a default modulation level. The default modulation level may be associated with the CPE's location with respect to the base station, for example in accordance with FIG. 3, for worst case environmental conditions. If the base station receives the request, it will measure the quality of the transmission uplink and respond to the CPE sending time slot allocations on the uplink and in accordance with the measured quality of the transmission link sending the modulation type and FEC coding level which the CPE is to use. The CPE will continue to make requests for a call until the base station responds.

Each call is routed in the CPE into a data transmission queue in accordance with its requested quality of service (via STEP iii). The data to be transmitted to the base station is partitioned into blocks and a Medium Access Control (MAC) header (72) is added to each block, as shown in the top layer of FIG. 7 (STEP ii). Each block is assigned a modulation scheme and FEC coding level depending on the measurement of quality of the uplink made by the base station and last transmitted to the CPE. As the call progresses the CPE will receive ongoing feedback from the base station about the quality of the uplink and will alter the modulation scheme and coding in response (STEP iv and v). Each block is then partitioned into segments (74) and the appropriate FEC coding (76) is added to each segment, as shown in the middle layer of FIG. 7 (STEP vi). The blocks are then re-assembled from the segments with FEC coding added and the blocks are grouped according to their allocated modulation level as shown in the bottom or physical layer of FIG. 7 (STEP vii). These groupings of blocks form the physical payload (78) for the physical layer to which is pre-appended a physical layer header, as shown in the bottom layer of FIG. 7. Again, this header is always allocated a modulation of 4-QAM (QPSK) and includes a preamble (80), a sync sequence (82) and information (84) stating the modulation and coding applied to the following physical payload. The thus, configured data is then sent to the CPE scheduler and transmitted to the base station across the transmission link in an order determined by the quality of service associated with each queue. At the base station the information in the header is recovered using QPSK signal detection and for example using correlation codes. The physical payload is then recovered by demodulation using a demodulation and coding scheme as set out in the physical header (STEP ix).

Figure 8B:
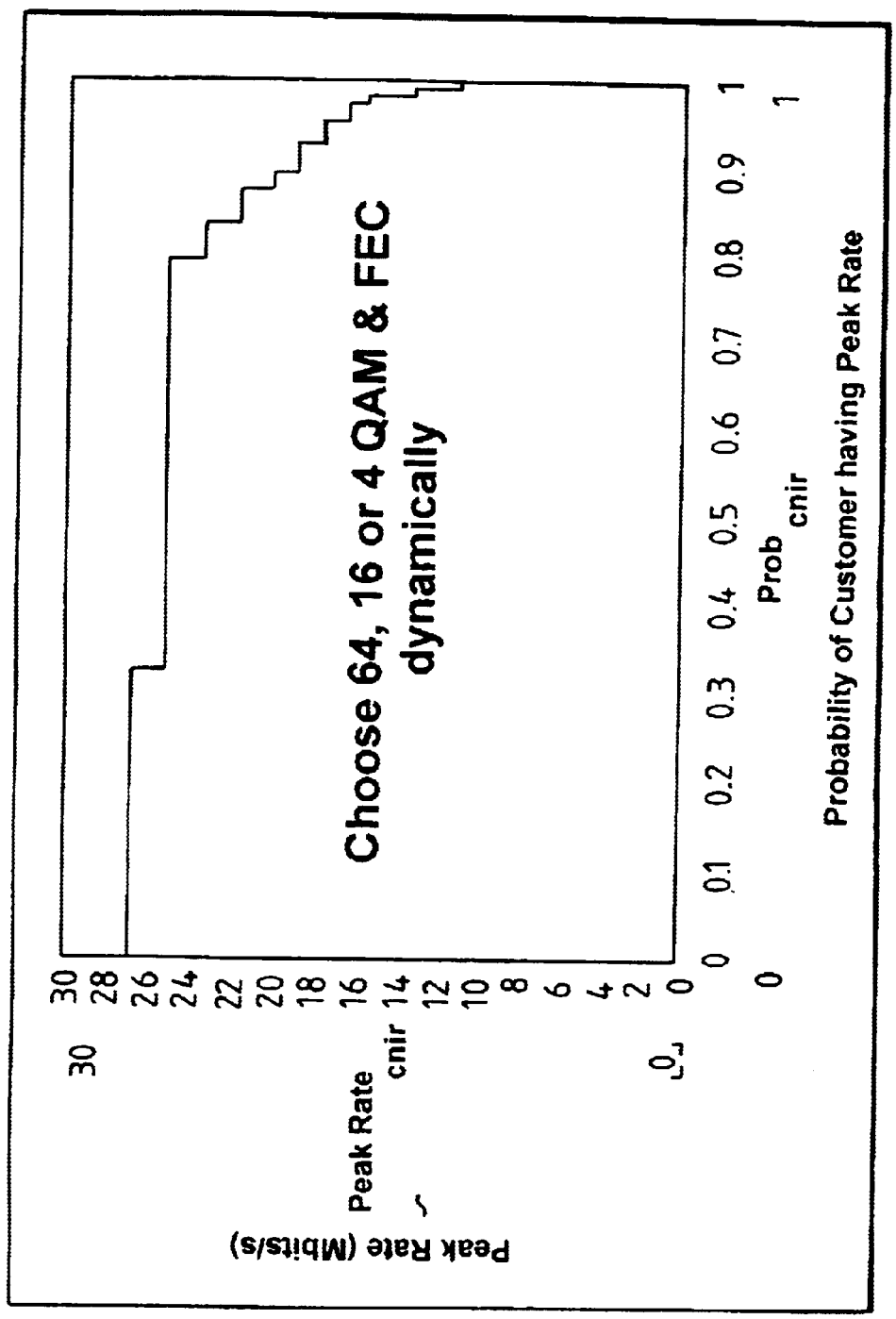

Using adaptive modulation and FEC coding as described above results in a more efficient use of bandwidth within a cell. As shown in FIG. 8b, around over 80% of customers will receive a data rate of 25 Mbits/s with a greater than 95% probability.

FIGS. 10 to 13 show a suitable configuration of a base station and CPE for use in the cellular radio communication system according to the present invention. In addition to the method described in relation to FIGS. 4 and 5, the base station and CPE configurations shown in FIGS. 10 to 13 operate a power control function.

Figure 10:
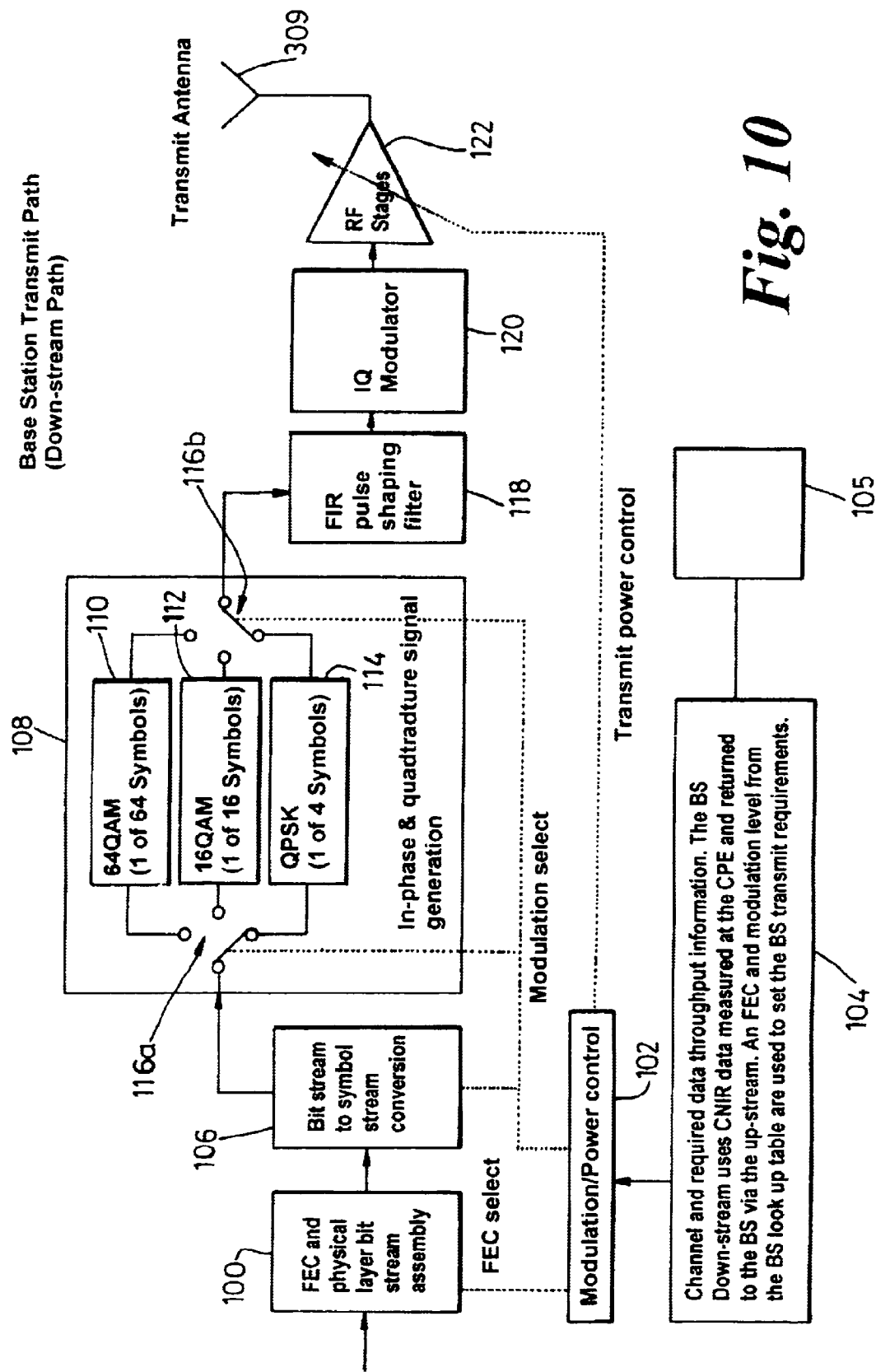
FIG. 10 shows the configuration of a base station transmit path according to the present invention.

FIG. 10 shows the configuration of the base station transmit path. The blocks of data with the MAC headers applied (as shown in the top layer of FIG. 7 and as generated by STEP ii of FIG. 4) is input into the FEC and physical layer bit stream assembly means (100). A level of FEC coding is applied to the blocks of data by the means (100) (as described in STEPs iv and vi of FIG. 4) in response to a FEC coding level input into the means by the modulation/power controller (102). The FEC coding level, modulation scheme and signal power to be applied at any time to the data blocks passing through the base station transmit path is fed to the modulation/power controller by the base station processor (104).

The base station processor (104) will receive the CNIR measurements from the CPEs in the cell and will interrogate a look up table or database (105) embodying the information in the graph of FIG. 6 and will select a coding (hereafter referred to as default coding) and a modulation scheme for the data blocks in accordance with the CNIR measurement from their destination CPE. The base station processor also carries out a power control function, to use all the downlink bandwidth by increasing the level of FEC coding applied to the blocks until all the bandwidth of the downlink is used. This increase in coding enables the power of signals transmitted over the downlink to be reduced, while still maintaining the required bit error rate. The reduction of signal power within the cell provides less interference to neighbouring cells so that neighbouring cells can support a higher data rate should they need to. Thus, the cells that do not require their entire bandwidth allocation effectively release bandwidth to their neighbouring cells. Therefore, based on the number of data blocks to be transmitted on the downlink the base station processor (104) calculates a level of coding to be applied to each data block in addition to selected default coding. This composite level of coding is then applied to the means (100) via the modulation/power controller (102) for the blocks of data passing through the means (100).

The blocks of data output from the means (100) are input into the bit stream to symbol conversion means (106). For 64-QAM the symbol conversion means converts blocks of 6 bits into 1 symbol (ie. 64 constellation points), for 16-QAM it converts blocks of 4 bits into 1 symbol (ie. 16 constellation points and for QPSK it converts blocks of 2 bits into 1 symbol (ie. 4 constellation points). The controller (102) inputs the modulation scheme to be applied to the data block for the data block then passing through the means (106) based on an input from the base station processor (104) which will have selected the required modulation scheme as discussed above. The IQ signal conversion block (108) comprises a 64-QAM IQ signal conversion arm (110), a 16-QAM IQ signal conversion arm (112), a QPSK signal conversion arm (114) and a pair of switch means (116a, 116b) for selecting the required arm (110), (112) or (114) depending on an input signal from the modulation/power controller (102). Depending on the data block passing through the IQ signal conversion block (108) the controller (102) will send a signal to the switch means (116a, 116b) dependent on the modulation scheme required for that data block and the switch means will switch to a position such that the data block passes through the required arm. The IQ signal conversion block (108) generates the voltage amplitudes that form the I and Q signals required to represent each symbol in a data block dependent on the modulation scheme to be applied to that data block. The I and Q signals are then input into the IQ modulator (120), after being filtered by a finite impulse response (FIR) shaping filter (118).

For example, where a data block requires QPSK modulation, then in response to the signal input from the controller (102) the switch means (116a, 116b) will switch to the position shown in FIG. 10 and the IQ signal conversion arm (114) will generate QPSK I and Q signals and the output will be passed through the IQ modulator (120) via the filter (118). The IQ modulator will generate a carrier wave modulated with 4 states. Where a data block requires 16-QAM modulation, then in response to the signal input from the controller (102) the switch means (116a, 116b) will switch so that the 16-QAM arm (112) will generate 16-QAM I and Q signals which will be passed to the IQ modulator (120) via the filter (118). The IQ modulator will generate a carrier wave modulated with 16 states. Where a data block requires 64-QAM modulation, then in response to the signal input from the controller (102) the switch means (116a, 116b) will switch so that the 64-QAM arm (110) will generate 64-QAM I and Q signals which will be passed to the IQ modulator via the filter (118). The IQ modulator will generate a carrier wave modulated with 64 states.

The signal output from the IQ modulator is then upconverted and amplified by amplifier (122) and transmitted over the downlink via antenna (309). The level of power generated by the amplifier (122) is dependent on an input from the modulation/power controller (102) dependent on the volume of data blocks passing through the base station. The level of power to be applied to a signal output from the base station transmit path at any time will be calculated by the base, station processor (104), as indicated above and input into the amplifier (122) via the controller (102).

Figure 11:
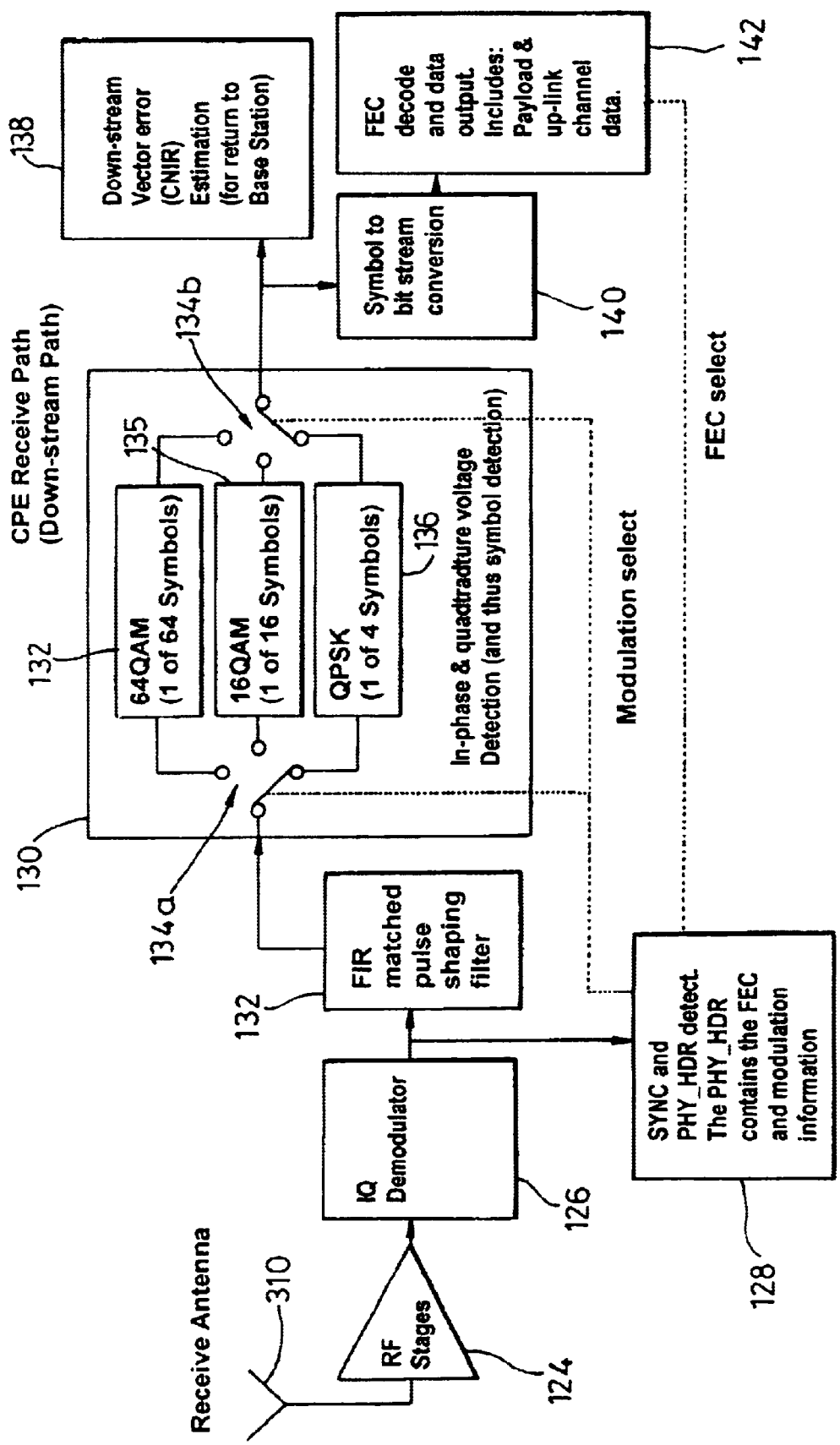
FIG. 11 shows the configuration of a CPE receive path according to the present invention.

FIG. 11 shows the CPE receive path. The CPE receives signals transmitted over the downlink via the antenna (310) and the received signal is downconverted in the rf stages (124) and demodulated in IQ demodulator (126). The output from the demodulator is input into a header information recovery means (128), which detects QPSK signals and recovers the header information, for example by applying correlation coding. The header information will include the modulation scheme and FEC coding level required to recover the data in the payload associated with the header. The output of the demodulator is also input into an IQ signal detection block (130) via a FIR matched pulse shaping filter (132). The recovery means 128 recovers the modulation scheme associated with the incoming payload and actuates switching means (134a, 134b) to switch the data output from the IQ modulator through the correct arm of the IQ signal detection block. The arm (132) is arranged to detect IQ signals sent using a 64-QAM modulation scheme, the arm (135) is arranged to detect IQ signals sent using a 16-QAM modulation scheme and the arm (136) is arranged to detect IQ signals using a QPSK modulation scheme.

For example where a physical payload sent using a QPSK modulation scheme is received and demodulated the recovery means (128) detects this and switches the switching means (134a, 134b) to the position shown in FIG. 11, so that the payload is passed through the arm (136) of the IQ signal detection block (130). Where a physical payload sent using a 16-QAM modulation scheme is received and demodulated the recovery means (128) detects this and switches the switching means (134a, 134b) so that the payload is passed through the arm (135) of the IQ signal detection block (130). Where a physical payload sent using a 64-QAM modulation scheme is received and demodulated the recovery means (128) detects this and switches the switching means (134a, 134b) so that the payload is passed through the arm (132) of the IQ signal detection block (130).

The output from the IQ signal detection block (130) is input into a vector error detection means (138). This measures the quality of the downlink and then passes this information into the CPE return path for transmission back to the base station for use by the base station processor (104).

The output from the IQ signal detection block is also passed to the symbol to bit conversion means (140). The data block output from the means (140) is decoded in decoding means (142) using the FEC coding level for that data block which is input from the recovery means (128).

Figure 12:
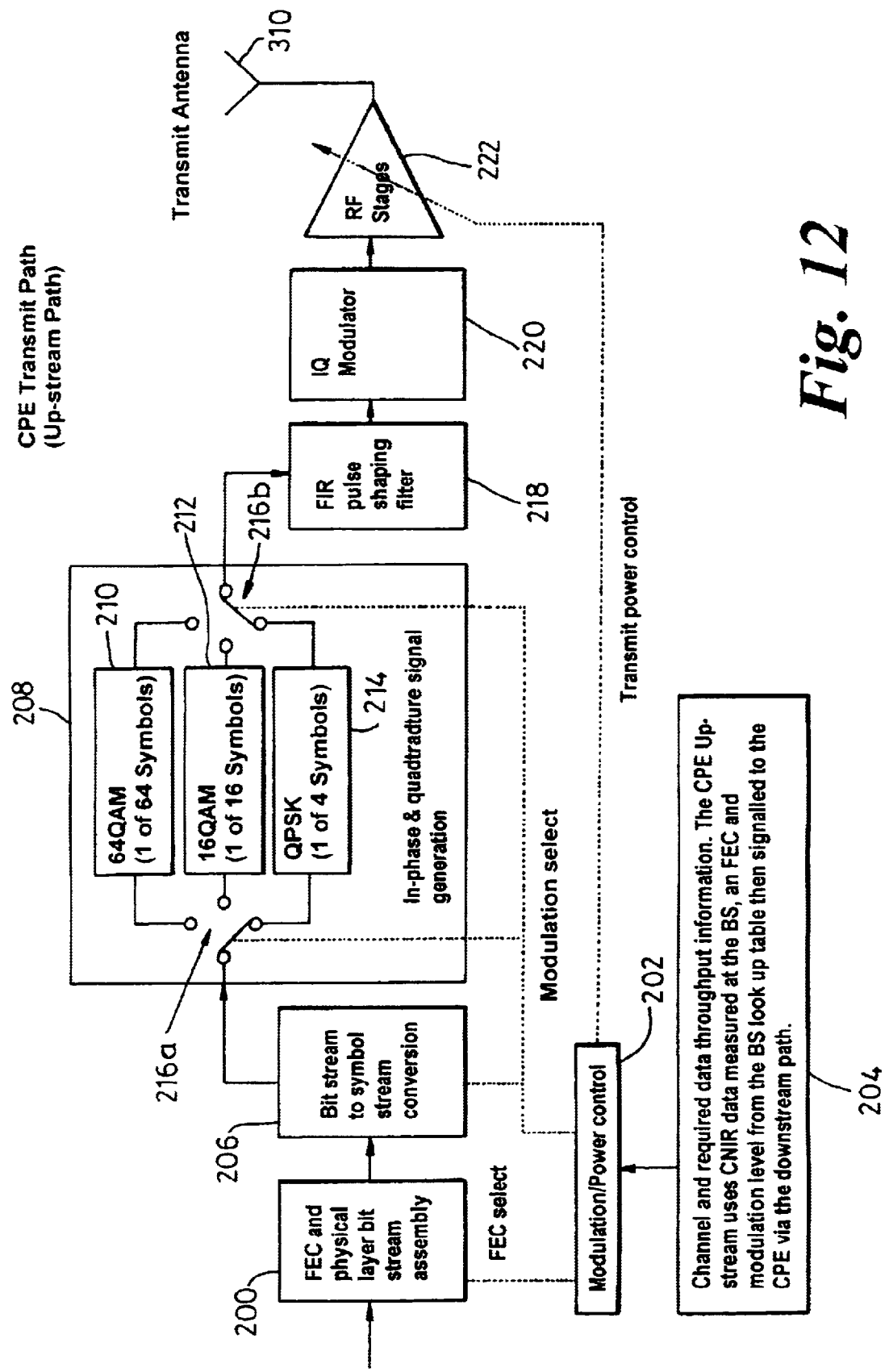
FIG. 12 shows the configuration of a CPE transmit path according to the present invention.

Referring now to FIG. 12 which shows the CPE transmit path. The blocks of data with the MAC headers applied (as shown in the top layer of FIG. 7 and as generated by STEP ii of FIG. 5) is input into the FEC and physical layer bit stream assembly means (200). A level of FEC coding is applied to the blocks of data by the means (200) (as described in STEPs iv and vi of FIG. 5) in response to a FEC coding level input into the means (200) by the modulation/power controller (202). The FEC coding level, modulation scheme and signal power to be applied at any time to the data blocks passing through the CPE transmit path is fed to the modulation/power controller by the CPE processor (204).

The CPE processor will receive the allocated FEC coding level and modulation scheme from the base station. The FEC coding level communicated from the base station is calculated at the base station processor (104) in accordance with the power control function so that the level of FEC coding applied to at least some of the blocks transmitted over the uplink is increased until all the bandwidth of the uplink is used. This increase in coding enables the power of signals transmitted over the uplink to be reduced, again based on instructions from the base station, while still maintaining the required bit error rate. The reduction of signal power within the cell provides less interference to neighbouring cells so that neighbouring cells can support a higher data rate should they need to.

Thus, the cells that do not require their entire bandwidth allocation effectively release bandwidth to their neighbouring cells. This composite level of coding is then applied to the means (200) via the modulation/power controller (202) for the block of data passing through the means (200).

The blocks of data output from the means (200) are input into the bit stream to symbol conversion means (206), which converts the input bit stream into an output symbol stream. The controller (202) inputs the modulation scheme to be applied to the data block for the data block then passing through the means (206) based on an input from the CPE processor (204) which will have selected the required modulation scheme as discussed above. The IQ signal conversion block (208) comprises a 64-QAM IQ signal conversion arm (210), a 16-QAM IQ signal conversion arm (212), a QPSK signal conversion arm (214) and a pair of switch means (216a, 216b) for selecting the required arm (210), (212) or (214) depending on an input signal from the modulation/power controller (202). Depending on the data block passing through the IQ signal conversion block (208) the controller (202) will send a signal to the switch means (216a, 216b) dependent on the modulation scheme required for that data block and the switch means will switch to a position such that the data block passes through the required arm. The IQ signal conversion block (208) generates the voltage amplitudes that form the I and Q signals required to represent each symbol in a data block dependent on the modulation scheme to be applied to that data block. The I and Q signals are then input into the IQ modulator (220), after being filtered by a finite impulse response (FIR) shaping filter (218).

For example, where a data block requires QPSK modulation, then in response to the signal input from the controller (202) the switch means (216a, 216b) will switch to the position shown in FIG. 12 and the IQ signal conversion arm (214) will generate QPSK I and Q signals and the output will be passed through the IQ modulator (220) via the filter (218). The IQ modulator will generate a carrier wave modulated with 4 states. Where a data block requires 16-QAM modulation, then in response to the signal input from the controller (202) the switch means (216a, 216b) will switch so that the 16-QAM arm (212) will generate 16-QAM I and Q signals which will be passed to the IQ modulator (220) via the filter (218). The IQ modulator will generate a carrier wave modulated with 16 states. Where a data block requires 64-QAM modulation, then in response to the signal input from the controller (202) the switch means (216a, 216b) will switch so that the 64-QAM arm (210) will generate 64-QAM I and Q signals which will be passed to the IQ modulator via the filter (218). The IQ modulator will generate a carrier wave modulated with 64 states.

The signal output from the IQ modulator is then upconverted and amplified by amplifier (222) and transmitted over the uplink via antenna (310). The level of power generated by the amplifier (222) is dependent on an input from the modulation/power controller (202) dependent on the volume of data blocks at that time being transmitted on the uplink. The level of power to be applied to a signal output from the CPE transmit path at any time will be set by the CPE processor (204) and input into the amplifier (222) via the controller (202).

Figure 13:
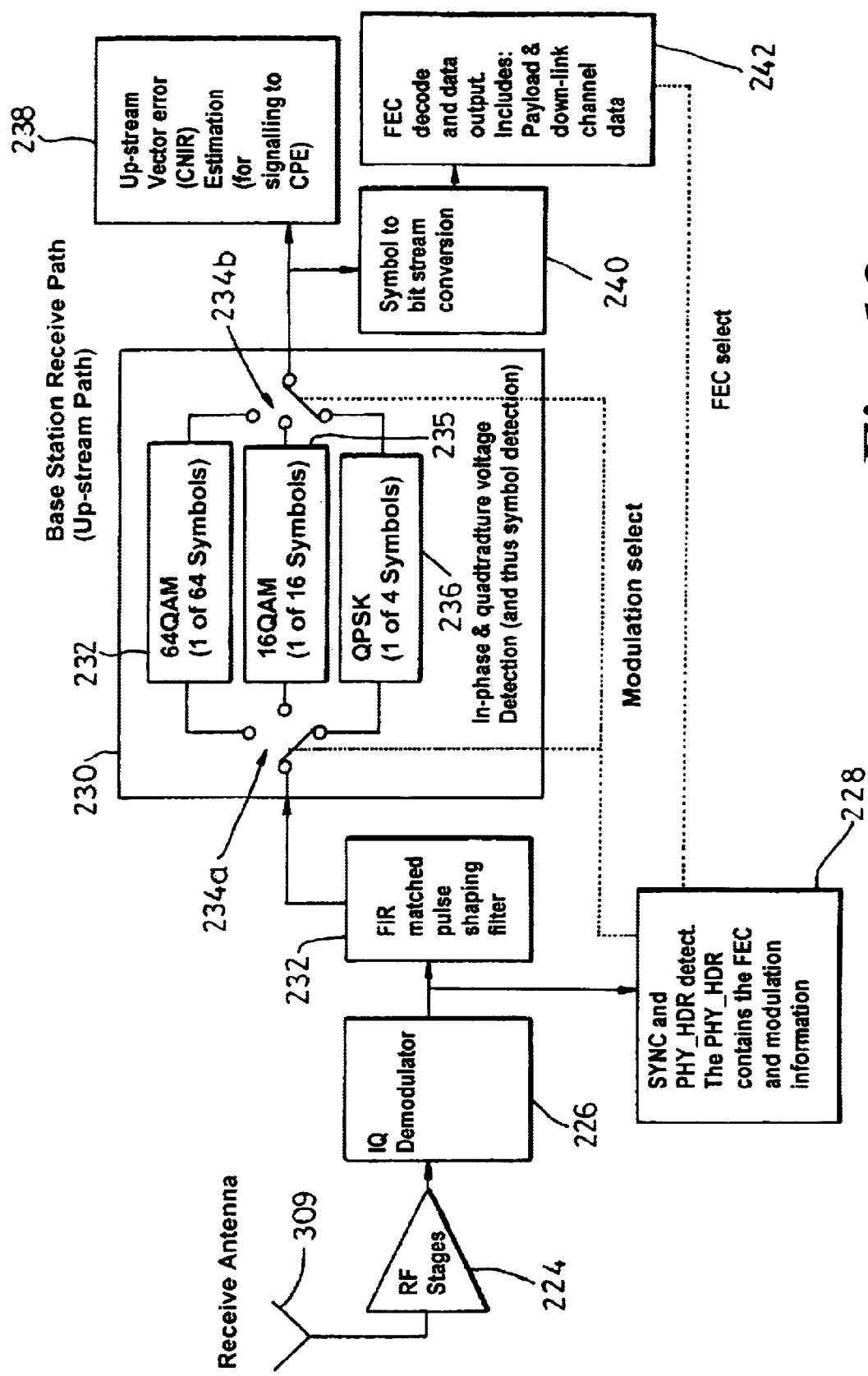
FIG. 13 shows the configuration of a base station receive path according to the present invention.

FIG. 13 shows the base station receive path. The base station receives signals transmitted over the uplink via the antenna (309) and the received signal is downconverted in the rf stages (224) and demodulated in IQ demodulator (226). The output from the demodulator is input into a header information recovery means (228), which detects QPSK IQ signals and recovers the header information, for example by applying correlation coding. The header information will include the modulation scheme and FEC coding level required to recover the data in the payload associated with the header. The output of the demodulator is also input into an IQ signal detection block (230) via a FIR matched pulse shaping filter (232). The recovery means (228) recovers the modulation scheme associated with the incoming payload and actuates switching means (234a, 234b) to switch the data output from the IQ modulator through the correct arm of the IQ signal detection block. The arm (232) is arranged to detect IQ signals sent using a 64-QAM modulation scheme, the arm (235) is arranged to detect IQ signals sent using a 16-QAM modulation scheme and the arm (236) is arranged to detect IQ signals using a QPSK modulation scheme.

For example where a physical payload sent using a QPSK modulation scheme is received and demodulated the recovery means (228) detects this and switches the switching means (234a, 234b) to the position shown in FIG. 11, so that the payload is passed through the arm (236) of the IQ signal detection block (230). Where a physical payload sent using a 16-QAM modulation scheme is received and demodulated the recovery means (228) detects this and switches the switching means (234a, 234b) so that the payload is passed through the arm (235) of the IQ signal detection block (230). Where a physical payload sent using a 64-QAM modulation scheme is received and demodulated the recovery means (228) detects this and switches the switching means (234a, 234b) so that the payload is passed through the arm (232) of the IQ signal detection block (230).

The output from the IQ signal detection block (230) is input into a vector error detection means (238). This measures the quality of the uplink and then passes this information into the base station return path for transmission back to the relevant CPE for use by the CPE processor (204).

The output from the IQ signal detection block is also passed to the symbol to bit conversion means (240). The data block output from the means (240) is decoded in decoding means (242) using the FEC coding level for that data block which is input from the recovery means (228).

What is claimed is:

1. A cellular radio communication system for transmitting blocks of data over transmission links, comprising:
   a database for storing sets of modulation scheme and forward error correction coding level pairs which give an optimum data rate at a predetermined bit error rate and a predetermined symbol rate for different quality transmission links;
   means for monitoring the quality of a transmission link;
   means for interrogating the database and allocating a modulation scheme and forward error correction coding level pair to the blocks of data transmitted over a transmission link dependent on the monitored quality of the transmission link; and
   means for applying the allocated modulation scheme and forward error correction coding level to the blocks of data.

2. A cellular radio communication system according to claim 1 wherein the modulation scheme can be selected from 64-QAM, 16-QAM and QPSK.

3. A cellular radio communication system according to claim 1 wherein the forward error correction coding used is a BCH forward error correction code.

4. A cellular communication system according to claim 1 wherein the transmission links are links between a plurality of end user terminals located within a cell and a base station located within the cell.

5. A cellular communication system according to claim 1 wherein the system comprises means for storing a default modulation scheme suitable for the or each transmission link in poor environmental conditions for use when a call is initiated over the transmission link.

6. A cellular communication system according to claim 1 wherein the transmission links are links between a plurality of end user terminals located within a cell and a base station located within the cell and the system comprises means for storing a default modulation scheme for each end user terminal dependent on the distance between the end user terminal and the base station for use when a call is initiated over the transmission link.

7. A cellular communication system according to claim 1 wherein the transmission links are links between a plurality of end user terminals located within a cell and a base station located within the cell and the system comprises means for adjusting the power of the transmission links dependent on the level of traffic over the transmission links while maintaining the predetermined bit error rate.

8. A cellular communication system according to claim 1 wherein the transmission links are links between a plurality of end user terminals located within a cell and a base station located within the cell and the system comprises means for increasing the level of forward error correction coding allocated to the transmission links so as to use the bandwidth of the transmission links and means for adjusting the power of the transmission links dependent on the change in the level of forward error correction coding to maintain the predetermined bit error rate.

9. A cellular communication system according to claim 1 wherein the transmission links are links between a plurality of end user terminals located within a cell and a base station located within the cell and the transmission links from the end user terminals to the base station comprise a common medium access uplink.

10. A cellular communication system according to claim 1 wherein the transmission links are links between a plurality of end user terminals located within a cell and a bass station located within the cell and the transmission links from the base station to the end user terminals comprise a broadcast downlink.

11. A cellular communication system according to claim 1 wherein a block of data comprises a header and a payload and the system comprises means for storing a default modulation scheme suitable for the or each transmission link in poor environmental conditions and the means for allocating a modulation scheme to the blocks of data transmitted over the transmission link allocates the default modulation scheme to the headers of the blocks of data.

12. A cellular communication system according to claim 1 wherein the transmission link is between a transmitting unit and a receiving unit and the receiving unit comprises:
   means for monitoring the quality of the transmission link; and
   means for communicating the quality of the transmission link to the transmitting unit; and
the transmitting unit comprises:
   means for interrogating the database and allocating a modulation scheme and forward error correction coding pair depending on the quality of the transmission link.

13. A base station for transmitting blocks of data over a plurality of transmission links to a plurality of end user terminals, comprising:
   a database for storing sets of modulation scheme and forward error correction level coding pairs which generate an optimum data rate at a predetermined bit error rate and a predetermined symbol rate for different quality transmission links;
   means for interrogating the database and allocating a modulation scheme and forward error correction coding pair to the blocks of data to be transmitted over each transmission link dependent on the quality of the transmission link; and
   means for applying the allocated modulation scheme and forward error correction coding level to the blocks of data.

14. A base station according to claim 13 wherein the modulation scheme can be selected from 64-QAM, 16-QAM and QPSK.

15. A base station according to claim 13 wherein the forward error correction coding used is a BCH forward error correction code.

16. A base station according to claim 13 wherein the transmission links are links between a plurality of end user terminals located within a cell associated with the base station.

17. A base station according to claim 13 wherein the base station comprises means for storing a default modulation scheme for each transmission link to the end user terminals in poor environmental conditions for use when a call is initiated.

18. A base station according to claim 13 wherein the base station comprises means for storing a default modulation scheme for each end user terminal dependent on the distance between the end user terminal and the base station for use when a call is initiated.

19. A base station according to claim 13 wherein the base station comprises means for adjusting the power of the transmission links dependent on the level of traffic over the transmission links while maintaining the predetermined bit error rate.

20. A base station according to claim 13 wherein the base station comprises means for increasing the level of forward error correction coding allocated to the transmission links so as to use the bandwidth of the transmission links and means for adjusting the power of the transmission links dependent on the change in the level of forward error correction coding to maintain the predetermined bit error rate.

21. A base station according to claim 13 comprising means for measuring the quality of the transmission link from each end user terminals and means for transmitting to each end user terminal the modulation scheme and forward error coding level associated with the measured quality.

22. A base station according to claim 13 wherein the transmission links from the base station to the end user terminals comprise a broadcast downlink.

23. A base station according to claim 13 wherein a block of data comprises a header and a payload, the base station comprises means for storing a default modulation scheme for each transmission link in poor environmental conditions and the means for allocating a modulation scheme to the blocks of data transmitted over the transmission links allocates the default modulation scheme to the headers of the blocks of data.

24. A base station according to claim 13 wherein the base station comprises means for receiving signals from the end user terminals representing the quality of the transmission links from the base station to the end user terminal.

25. An end user terminal comprising:
   a receiver and a transmitter for receiving and transmitting blocks of data over a transmission link to a base station; and
   means for applying a modulation scheme and forward error correction coding level to the blocks of data in accordance with instructions from the base station wherein the modulation scheme and forward error correction level generate an optimum data rate over the transmission link for a predetermined symbol rate and a predetermined bit error rate.

26. An end user terminal according to claim 25 wherein the modulation scheme can be is selected from 64-QAM, 16-QAM and QPSK.

27. An end user terminal according to claim 25 wherein the forward error correction coding used is a BCH forward error correction code.

28. An end user terminal according to claim 25 wherein a default modulation scheme is allocated to the end user terminal for use when a call is initiated.

29. An end user terminal according to claim 25 wherein a default modulation scheme is allocated to the end user terminal dependent on the distance between the end user terminal and the base station for use when a call is initiated.

30. An end user terminal according to claim 25 additionally comprising means for adjusting the power of the transmission link dependent on an instruction from the base station wherein the power is adjusted dependent on the level of traffic over all transmission links to the base station while maintaining the predetermined bit error rate.

31. An end user terminal according to claim 25 comprising means for measuring the quality of the incoming transmission link and means for transmitting the measured quality to the base station.

32. An end user terminal according to claim 25 wherein the transmission link from the end user terminal to the base station comprises part of a common medium access uplink.

33. An end user terminal according to claim 25 wherein a block of data comprises a header and a payload, a default modulation scheme is allocated to the end user terminal by the base station and the means for applying a modulation scheme applies the default modulation scheme to the headers of the blocks of data.

34. A transmitting unit for transmitting signals over at least one transmission link, which signals carry blocks of data wherein the transmitting unit comprises:
a database for storing modulation schemes which generate an optimum data rate at a predetermined bit error rate and symbol rate for different quality transmission links;
a processor for interrogating the database and allocating a modulation scheme to the blocks of data to be transmitted dependent on the quality of the transmission link;
an IQ signal generation means comprising:
a first arm for generating an IQ signal for a first modulation scheme;
a second arm for detecting an IQ signal for a second modulation scheme; and
switching means for switching data through one or the other of the arms dependent on the modulation scheme allocated to the data.

35. A transmitting unit according to claim 34 wherein the database stores sets of modulation and forward error coding level pairs which generate an optimum data rate at a predetermined bit error rate and symbol rate for different quality transmission links and the processor allocates a forward error correction level to the blocks of data to be transmitted dependent on the quality of the transmission link and the transmitting unit additionally comprises a forward error correction coding means for applying the allocated level of error correction coding to the data blocks before the date blocks are input into the IQ signal generation means.

36. A transmitting unit according to claim 34 wherein the IQ signal generation block additionally comprises a third arm and the switching mean switches the data blocks through one of the three arms depending on the modulation scheme allocated to the data block and the first arm is arranged to generate 64-QAM IQ signals, the second arm arranged to generate 16-QAM IQ signals and the third arm is arranged to generate 4-QAM IQ signals.

37. A transmitting unit according to claim 34 additionally comprising an IQ modulator for modulating the output from the IQ signal generation block to generate and intermediate frequency signal, an upconverter means for upconverting the intermediate frequency signal to a radio frequency signal and a transmitting antenna for transmitting the radio frequency signal over the transmission link.

38. A transmitting unit according to claim 34 wherein the processor determines an optimum power for the transmission links depending on the level of traffic on the links and generates a power control signal and the unit additionally comprises:
an IQ modulator for modulating the output from the IQ signal generation block to generate and intermediate frequency signal;
an upconverter means for upconverting the intermediate frequency signal to a radio frequency signal;
an amplifier means for amplifying the radio frequency signal responsive to the power control signal; and
a transmitting antenna for transmitting the radio frequency signal over the transmission link.

39. A method of operating a cellular radio communication system for transmitting blocks of data over transmission links, comprising the steps of:
storing, in a database, sets of modulation scheme and forward error correction coding level pairs which give an optimum data rate at a predetermined bit error rate and a predetermined symbol rate for different quality transmission links;
monitoring the quality of a transmission link;
interrogating the database and allocating a modulation scheme and forward error correction coding level pair to the blocks of data transmitted over the link dependent on the monitored quality of the transmission link; and
applying the allocated modulation scheme and forward error correction coding level to the blocks of data.

40. A method according to claim 39 wherein the modulation scheme can be selected from 64-QAM, 16-QAM and QPSK.

41. A method according to claim 39 wherein the forward error correction coding used is a BCH forward error correction code.

42. A method according to claim 39 wherein the transmission links are links between a plurality of end user terminals located within a cell and a base station located within the cell.

43. A method according to claim 39 comprising the additional step of storing a default modulation scheme suitable for the or each transmission link in poor environmental conditions for use when a call is initiated over the transmission link.

44. A method according to claim 39 wherein the transmission links are links between a plurality of end user terminals located within a cell and a base station located within the cell and the method comprising the additional step of storing a default modulation scheme for the transmission link to each end user terminal dependent on the distance between the end user terminal and the base station for use when a call is initiated over the transmission link.

45. A method according to claim 39 wherein the transmission links are links between a plurality of end user terminals located within a cell and a base station located within the cell and the method comprises the additional step of adjusting the power of the transmission links dependent on the level of traffic over the transmission links while maintaining the predetermined bit error rate.

46. A method according to claim 39 wherein the transmission links are links between a plurality of end user terminals located within a cell and a base station located within the cell and the method comprises the additional steps of:
increasing the level of forward error correction coding level above the allocated level to use the bandwidth of the transmission links; and
adjusting the power of the transmission links dependent on the change in the level of forward error correction coding level to maintain the predetermined bit error rate.

47. A method according to claim 39 wherein the transmission links are links between a plurality of end user terminals located within a cell and a base station located within the cell and the transmission links from the end user terminals to the base station comprise a common medium access uplink.

48. A method according to claim 39 wherein the transmission links are links between a plurality of end user terminals located within a cell and a base station located within the cell and the transmission links from the base station to the end user terminals comprise a broadcast downlink.

49. A method according to claim 39 wherein a block of data contains a payload and a header and the method comprises the steps of storing a default modulation scheme suitable for the or each transmission link in poor environmental conditions and allocating the default modulation scheme to the headers of the blocks of data for that transmission link.

50. A method according to claim 39 wherein the transmission link is from a base station to an end user terminal and the method comprises the additional steps of:
- the end user terminal monitoring the quality of the transmission link received by it;
- the end user terminal communicating the quality of the transmission link to the base station; and
- the base station interrogating the database and allocating a modulation scheme and forward error correction coding pair depending on the quality of the transmission link.

51. A method according to claim 39 wherein the transmission link is from an end user terminal to a base station and the method comprises the additional steps of:
- the base station monitoring the quality of the transmission link received by it;
- the base station interrogating the database and allocating a modulation scheme and forward error correction coding pair depending on the quality of the transmission link; and
- the base station communicating the allocated modulation scheme and forward error correction coding pair to the end user terminal.

52. A cellular radio communication system for transmitting data over transmission links, wherein different modulation scheme and forward error correction coding level pairs are dynamically allocated to the transmission links so as to give an optimum data rate at a predetermined bit error rate and a predetermined symbol rate, wherein the different modulation scheme and forward error correction coding level pairs are dynamically allocated depending on the quality of the transmission links and the quality of transmission links are periodically monitored.

53. A cellular radio communication system according to claim 52 wherein the transmission links are links between a plurality of end user terminals located within a cell and a base station located within the cell.

54. A cellular radio communication system according to claim 52 wherein the system allocates a default modulation scheme for each transmission link for use when a call is initiated over the transmission link.

55. A cellular radio communication system according to claim 52 wherein the transmission links are links between a plurality of end user terminals and a base station and the system comprises means for adjusting the power of the transmission links dependent on the level of traffic over the transmission links while maintaining the predetermined bit error rate.

56. A cellular radio communication system for transmitting data over transmission links, wherein different modulation scheme and forward error correction coding level pairs are dynamically allocated to the transmission links so as to give an optimum data rate at a predetermined bit error rate and a predetermined symbol rate, wherein the transmission links are links between a plurality of end user terminals and a base station and the system comprises:
- means for increasing the level of forward error correction coding allocated to the transmission links so as to use all the bandwidth of the transmission links; and
- means for adjusting the power of the transmission links dependent on the change in the level of forward error correction coding to maintain the predetermined bit error rate.

57. A cellular radio communication system according to claim 52 wherein a block of data comprises a header and a payload and a default modulation scheme is allocated to the headers of the blocks of data.

58. A cellular radio communication system according to claim 56 wherein the different modulation scheme and forward error correction coding level pairs are dynamically allocated depending on the quality of the transmission links.

* * * * *